US012076827B1

United States Patent
Brosseau et al.

(10) Patent No.: US 12,076,827 B1
(45) Date of Patent: Sep. 3, 2024

(54) EXTENSION REMOVAL TOOL

(71) Applicant: PRATT & WHITNEY CANADA CORP., Longueuil (CA)

(72) Inventors: Dave Brosseau, Sainte-Catherine (CA); Paul Dumitrache, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/327,939

(22) Filed: Jun. 2, 2023

(51) Int. Cl.
| | |
|---|---|
| *B23P 19/04* | (2006.01) |
| *B23P 11/02* | (2006.01) |
| *B23P 19/02* | (2006.01) |
| *B23P 19/027* | (2006.01) |
| *B25B 27/02* | (2006.01) |

(52) U.S. Cl.
CPC ............. *B23P 19/04* (2013.01); *B23P 11/02* (2013.01); *B23P 19/022* (2013.01); *B23P 19/025* (2013.01); *B23P 19/027* (2013.01); *B25B 27/026* (2013.01)

(58) Field of Classification Search
CPC . B23P 11/02; B23P 19/02–022; B23P 19/025; B23P 19/027; B25B 27/02–026; Y10T 29/49822; Y10T 29/53652; Y10T 29/5383; Y10T 29/53848; Y10T 29/53857; Y10T 29/53883
See application file for complete search history.

(56) References Cited

FOREIGN PATENT DOCUMENTS

| | | | |
|---|---|---|---|
| CN | 209063008 U | 7/2019 | |
| KR | 101223703 B1 * | 1/2013 | |
| KR | 10-2455435 B1 | 10/2022 | |
| WO | WO-2016108365 A1 * | 7/2016 | ............. B25B 27/02 |

OTHER PUBLICATIONS

Translation of WO2016108365 (Year: 2016).*
Translation of KR101223703 (Year: 2013).*

* cited by examiner

*Primary Examiner* — Matthew P Travers
(74) *Attorney, Agent, or Firm* — NORTON ROSE FULBRIGHT CANADA LLP

(57) ABSTRACT

A tool assembly for disassembling a crankshaft assembly with a main shaft received within a hollow extension shaft along a shaft axis and coupled thereto via an interference fit, the extension shaft having a fastener slot. The tool assembly includes a main tool body having a central bore, a main tool body inner surface circumscribing the central bore, and a main tool body outer surface having a fastener bore, the central bore dimensioned for axially receiving the extension shaft, with the fastener bore axially aligned with the extension shaft fastener slot. A fastener is concurrently fastenable to the main tool body via the fastener bore and the hollow extension shaft via the fastener slot. An actuator assembly with a linearly-displacing actuating element is coupled to the main tool body and applies a force, via the actuating element, against an end of the main shaft in a direction along the axis.

20 Claims, 9 Drawing Sheets

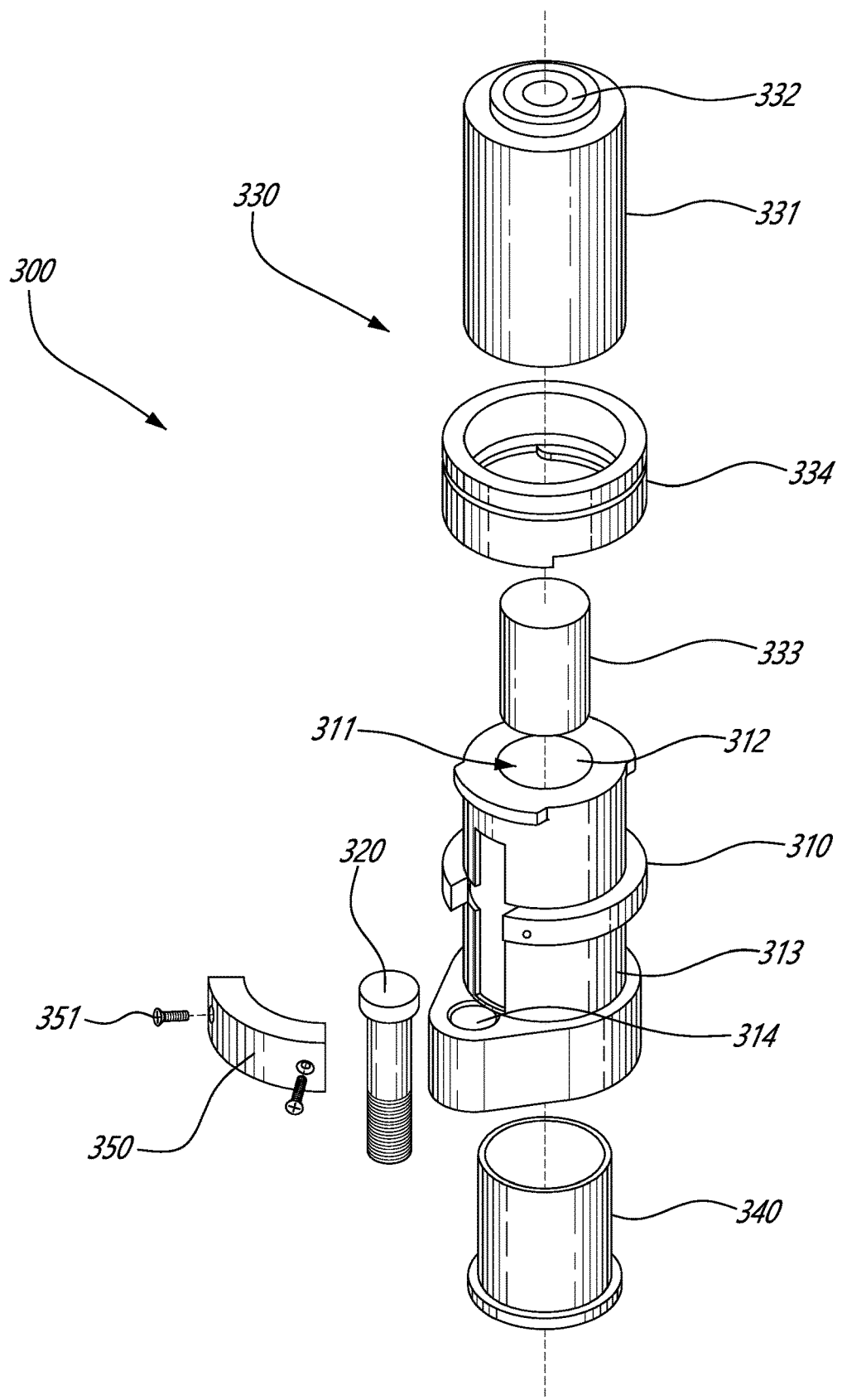

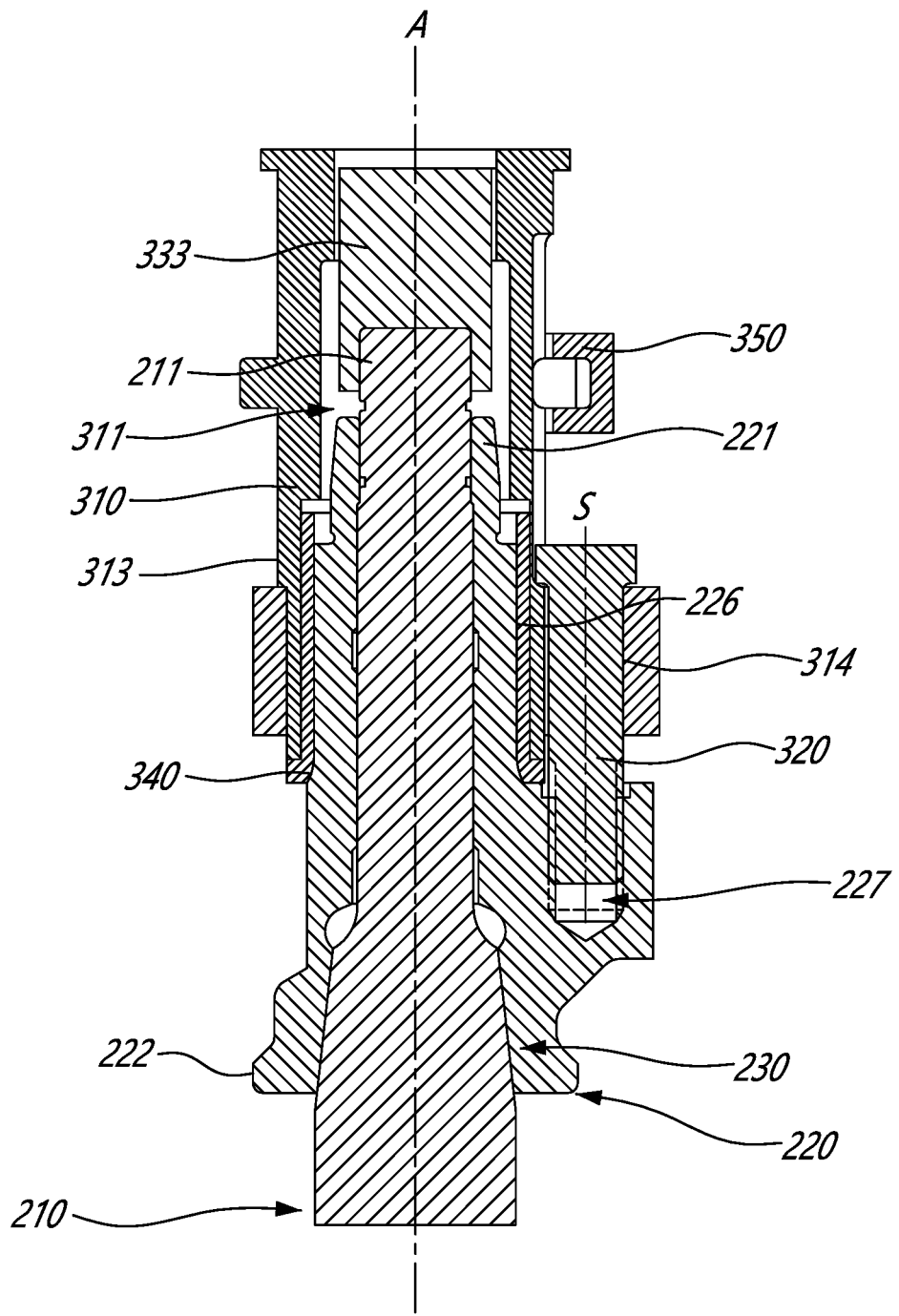

EXTENSION REMOVAL TOOL

TECHNICAL FIELD

The disclosure relates generally to aircraft engines, and, more particularly, to the disassembly of crankshafts in aircraft engines.

BACKGROUND

In some aircraft engines, for instance those including one or more rotary internal combustion engines, a crankshaft may be provided with eccentric lobes and an extension portion joined to a main crankshaft portion at an interference fit. Such crankshaft assemblies may be suitable for their intended purposes, however improvements are always desirable.

SUMMARY

In one aspect, there is provided a tool assembly for disassembling a crankshaft assembly, the crankshaft assembly including a main shaft received within a hollow extension shaft along a shaft axis and operatively coupled to the extension shaft via an interference fit, the hollow extension shaft having an extension shaft fastener slot, the tool assembly comprising: a main tool body having a main tool body central bore, a main tool body inner surface circumscribing the main tool body central bore, and a main tool body outer surface having a main tool body fastener bore, the main tool body central bore dimensioned for axially receiving the hollow extension shaft within the main tool body central bore, with the main tool body fastener bore axially aligned with the extension shaft fastener slot; a fastener dimensioned to be concurrently fastened to the main tool body via the main tool body fastener bore and the hollow extension shaft via the extension shaft fastener slot; and an actuator assembly with a linearly-displacing actuating element operatively coupled to the main tool body and operable for applying a force, via the linearly-displacing actuating element, against an end of the main shaft in a first direction from the actuator assembly towards the end of the main shaft along the shaft axis.

In another aspect, there is provided a method of disassembling a shaft assembly including a first shaft operatively coupled to a second shaft via an interference-fit linkage and extending along a shaft axis, comprising: installing a shaft removal tool to the shaft assembly, including installing a fastener to operatively couple the shaft removal tool to the second shaft; and using the shaft removal tool, separating the first shaft from the second shaft by applying a pushing force against the first shaft in a first direction along the shaft axis, the pushing force causing the shaft removal tool to apply a pulling force, in response to the pushing force, against the second shaft in a second direction along the shaft axis opposite the first direction via the fastener to overcome a frictional force at the interference-fit linkage.

In a further aspect, there is provided a system for disassembling a crankshaft assembly, comprising: a main shaft having a main shaft radially outer surface extending from a main shaft first end to a main shaft second end along a shaft axis, the main shaft radially outer surface including a main shaft frustoconical portion along a length of the main shaft, the main shaft being rotatable about the shaft axis and axially fixed in place; an extension shaft having an extension shaft central bore, an extension shaft radially inner surface circumscribing the extension shaft central bore, and an extension shaft radially outer surface extending between an extension shaft first end and an extension shaft second end along the shaft axis, the extension shaft radially inner surface including an extension shaft frustoconical portion, the main shaft receivable within the extension shaft central bore with the main shaft frustoconical portion engaging the extension shaft frustoconical portion at a frustoconical linkage, the extension shaft further including an extension shaft fastener slot eccentrically disposed on the extension shaft radially outer surface; a main tool body having a main tool body central bore, a main tool body radially inner surface circumscribing the main tool body central bore, and a main tool body radially outer surface having a main tool body fastener bore, the extension shaft receivable within the main tool body central bore with the main tool body fastener bore axially aligned with the extension shaft fastener slot; a fastener dimensioned to be concurrently fastened to the main tool body via the main tool body fastener bore and the extension shaft via the extension shaft fastener slot; and an actuator assembly with a linearly-displacing actuating element operatively coupled to the main shaft first end, the actuator operable to apply a force, via the linearly-displacing actuating element, against the main shaft in a first direction from the actuator assembly towards the main shaft first end along the shaft axis.

BRIEF DESCRIPTION OF THE DRAWINGS

Reference is now made to the accompanying figures in which:

FIG. 3 is an exploded perspective view of a tool assembly for the disassembly of the crankshaft assembly of FIGS. 2A-2B; and FIG. 4A-4E are schematic cross sectional views of an exemplary disassembly process of the crankshaft assembly of FIGS. 2A-2B using the tool assembly of FIG. 3.

DETAILED DESCRIPTION

Figure 1:
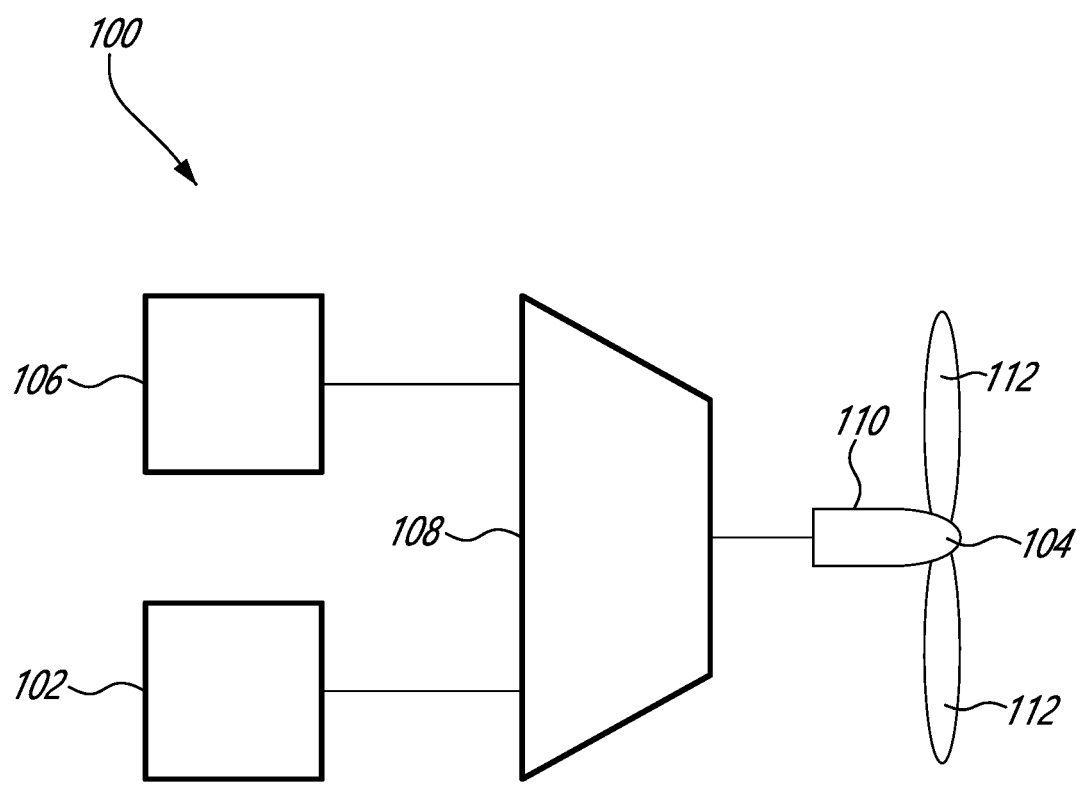
FIG. 1 is a schematic view of an exemplary hybrid electric powerplant system for an aircraft constructed in accordance with an embodiment of the present disclosure.

FIG. 1 illustrates an exemplary hybrid electric powerplant system 100 of a type preferably provided for use in subsonic flight. The system 100 includes a thermal engine 102 operatively connected to drive a load such as a propeller 104. An electric motor 106 is operatively connected to the thermal engine 102 to drive the propeller 104 together with the thermal engine 102. A transmission 108, e.g. including a combining gear box and/or reduction gear box, connects the thermal engine 102 and the electric motor 106 in parallel to drive the propeller 104. Illustratively, the propeller is a variable pitch propeller, wherein a variable pitch control 110 can rotate the blades 112 to various different pitch angles. A disconnect can be included between each torque source 102, 106 that can be located either in the transmission 108 or at the output of the individual torque source 102, 106. The thermal engine 102 may include one or more rotary internal combustion engines operatively coupled to the propeller 104 directly or indirectly via a crankshaft assembly 200 (see FIG. 2). Other thermal engine types may be contemplated. In some embodiments, other powerplant systems, for instance powered solely by a thermal engine and/or operatively coupled to another thrust-generating device, may be contemplated.

Figure 2A:
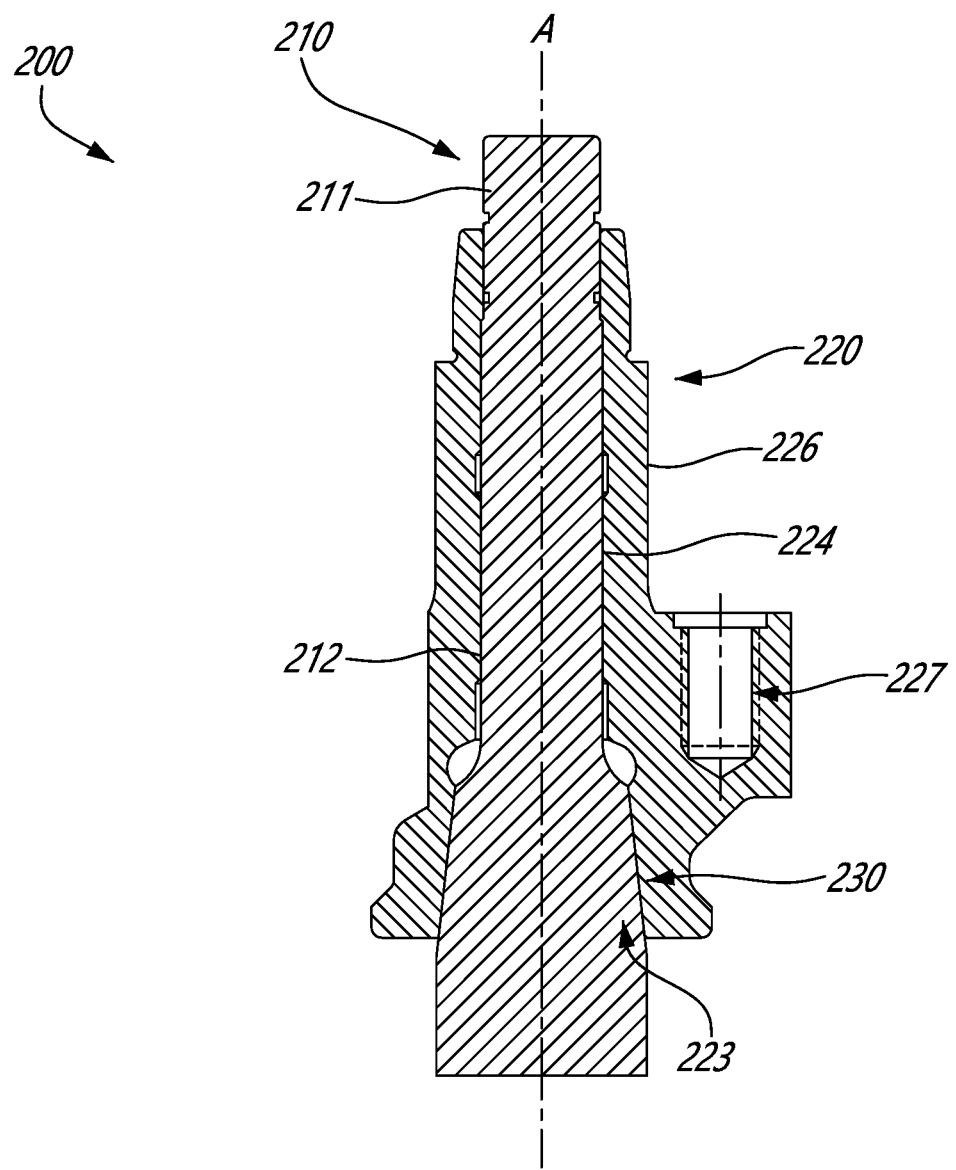
FIGS. 2A and 2B are, respectively, assembled and disassembled schematic cross sectional views of a crankshaft assembly for a thermal engine of the hybrid electric powerplant system of FIG. 1.
Figure 2B:
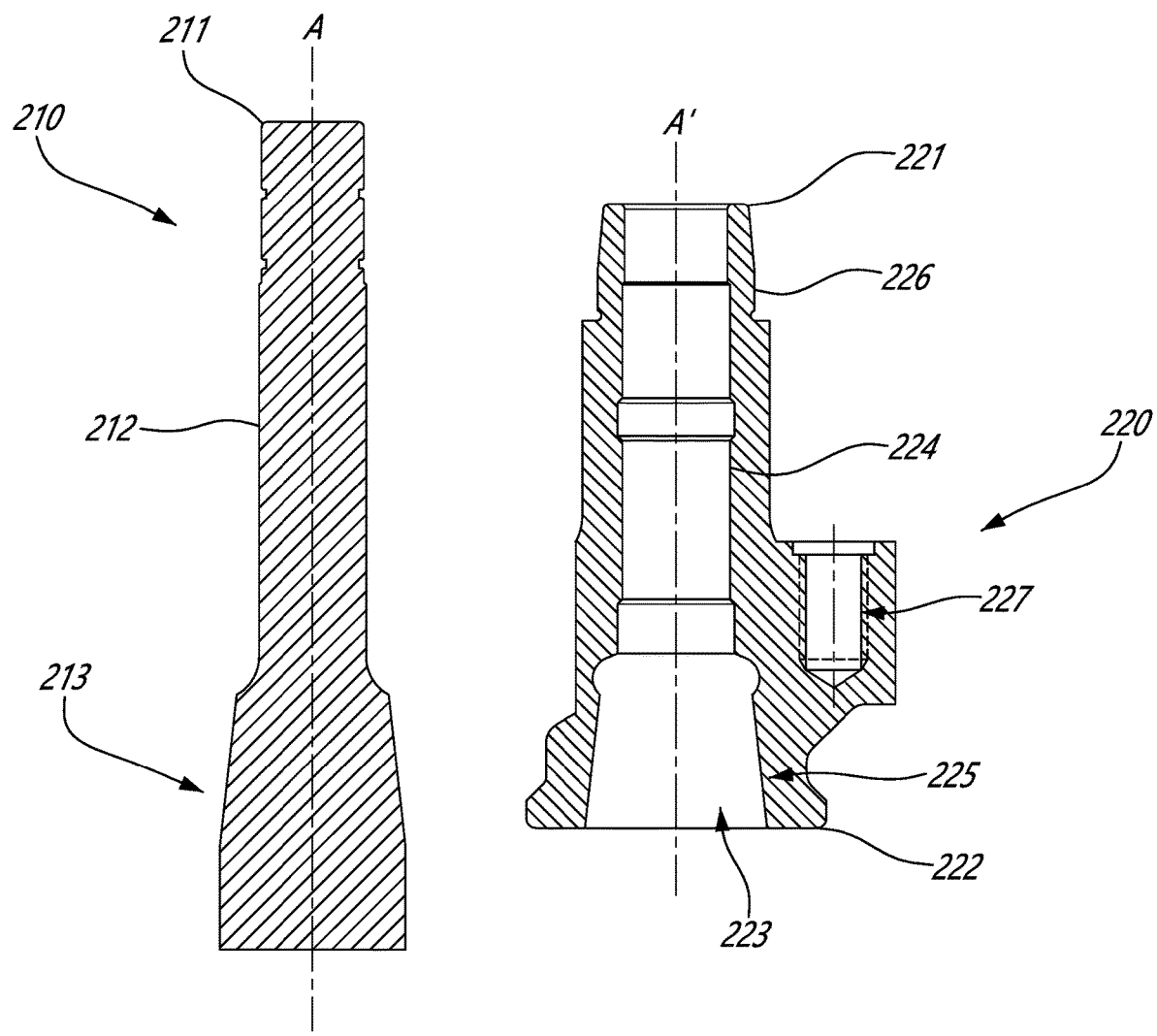

FIGS. 2A-2B illustrate an exemplary crankshaft assembly 200 for the thermal engine 102 of system 100. In some cases, the thermal engine 102 includes a plurality of rotary internal combustion engines drivingly coupled to the crankshaft assembly 200 for transmitting rotary motion to the propeller 104 (or another like thrust-generating device). In such cases, for instance where four or more rotary engines are drivingly coupled to the crankshaft assembly 200, the crankshaft assembly 200 may be formed of multiple sections, for instance to withstand the loads and provide sufficient length for the numerous operatively-coupled rotary engines. In the shown case, the crankshaft assembly 200 includes a main shaft 210 (also referred to as a first shaft) operatively coupled to an extension shaft 220 (also referred to as a second shaft) via an interference fit (e.g., a frustoconical linkage). In other cases, additional extension shafts may be provided, for instance where additional rotary engines are operatively coupled to the crankshaft assembly 200.

The main shaft 210 extends from a main shaft first end 211 to a main shaft second end (not shown) along a shaft axis A and includes eccentrically-shaped lobes (not shown) at positions along its length where the rotary engines are operatively coupled. While the main shaft 210 is shown to be solid, in some cases the main shaft 210 may include a hollow core and/or various passages passing therethrough. The main shaft 210 includes a main shaft radially outer surface 212 with a main shaft frustoconical portion 213 disposed thereon. Stated differently, an outer diameter of the main shaft 210 increases along the shaft axis A at the main shaft frustoconical portion 213. A tangent line at the main shaft frustoconical portion 213 may form an angle with the shaft axis A that may vary. In some cases, this angle may be about 7 degrees.

The extension shaft 220 illustratively extends from an extension shaft first end 221 to an extension shaft second end 222 along a shaft axis A and may include eccentrically-shaped lobes at positions along its length where the rotary engines are operatively coupled. In other cases, the eccentrically-shaped lobes may only be present on the main shaft 210, with the extension shaft 220 providing the additional required length. The extension shaft 220 is shown to have an extension shaft central bore 223 from the extension shaft first end 221 to the extension shaft second end 222, and is circumscribed by an extension shaft radially inner surface 224. The extension shaft 220 may thus be said to be hollow. The extension shaft radially inner surface 224 includes an extension shaft frustoconical portion 225 disposed thereon, which may correspond (i.e., have a like tangent angle relative to the shaft axis A) to the main shaft frustoconical portion 213 for mating engagement between the main shaft 210 and the extension shaft 220. The extension shaft 220 includes an extension shaft radially outer surface 226 with an extension shaft fastener slot 227 eccentrically disposed thereon, as will be discussed in further detail below.

FIG. 2A shows the crankshaft assembly 200 in an assembled configuration or state, whereby the main shaft 210 is inserted in the extension shaft central bore 223, with the main shaft radially outer surface 212 engaged with the extension shaft radially inner surface 224, and the main shaft frustoconical portion 213 engaged with the extension shaft frustoconical portion 225. The engagement between the main shaft frustoconical portion 213 and the extension shaft frustoconical portion 225 (which may be referred to as a frustoconical linkage 230) may provide the principle retention force between the main shaft 210 and the extension shaft 220, i.e., a high level of friction to overcome to separate the main shaft 210 from the extension shaft 220 to achieve a disassembled configuration or state of the crankshaft assembly 200 (shown in FIG. 2B). Other interference fits between the main shaft 210 and extension shaft 220 having a high level of friction to be overcome may be contemplated. Of note, in the disassembled configuration of the crankshaft assembly 200, the extension shaft may be said to extend from extension shaft first end 221 to extension shaft second end 222 along an extension shaft axis A'.

Referring to FIG. 3, an exemplary tool assembly 300 is shown for disassembling the crankshaft assembly 200. The depicted tool assembly 300 includes a main tool body 310 (also referred to as a puller body) operatively couplable to the crankshaft assembly 200, a fastener 320 for fastening the tool assembly 300 to the extension shaft 220, and an actuator assembly 330 for applying the necessary forces to disassemble the crankshaft assembly 200. Other components may be included with the tool assembly 300, such as a protective sleeve 340 and a fastener protective element 350, as will be discussed in further detail below. The tool assembly 300 and crankshaft assembly 200 may be collectively referred to as a system for disassembling a crankshaft. As will be discussed in further detail below, the tool assembly 300 may engage the crankshaft assembly 200, and in particular the main shaft 210, at the main shaft first end 211. This may provide access to the crankshaft assembly 200 while avoiding other locations along the length of the crankshaft assembly 200 that may be difficult to access and/or have adjacent components with critical surfaces susceptible to damage.

Referring jointly to FIGS. 3 and 4A-4E, the main tool body 310 includes a main tool body central bore 311 for engaging the crankshaft assembly 200 (in particular for receiving the extension shaft 220). A main tool body radially inner surface 312 circumscribes the main tool body central bore 311, while a main tool body radially outer surface 313 has an eccentric portion extending therefrom, the eccentric portion including a main tool body fastener bore 314 extending therein in parallel to the central axis of the main tool body 310. The main tool body fastener bore 314 is alignable with the extension shaft fastener slot 227 so that the fastener 320 may be received in both the main tool body fastener bore 314 and the extension shaft fastener slot 227 to secure the main tool body 310 to the extension shaft 220. In some cases, the fastener 320 is a threaded fastener, with both the main tool body fastener bore 314 and the extension shaft fastener slot 227 being internally threaded. In such cases, the fastener 320 may be insertable through the main tool body fastener bore 314 and the extension shaft fastener slot 227 in a direction parallel to the shaft axis A (illustratively along slot axis S). The dimensions of the fastener 320 may vary, for instance based on the sizes of the components being fastened together. The fastener 320 may have various strength requirements, for instance to withstand a pulling force of the tool assembly 300 acting against the extension shaft 220, as will be discussed in further detail below. Other fastener types and securing means to the main tool body 310 and extension shaft 220 may be contemplated. It is also understood that more than one fastener could be used.

As discussed above, the actuator assembly 330 is operable for applying the necessary forces to disassemble the crankshaft assembly 200. The depicted actuator assembly 330 includes an outer cylinder 331 that remains static during actuation and an inner cylinder 332, also referred to as a linearly-displacing actuating element, movably disposed within the outer cylinder 332 to perform the actuation movement. The outer cylinder 331 and inner cylinder 332 may be collectively referred to as a fluid driven actuator or cylinder such as a hydraulic cylinder, although other actuation means may be contemplated. The actuator assembly 330 is mountable or couplable to the main shaft 210 at the main shaft first end 211 to apply a pushing force against the main shaft 210 in a first direction along the shaft axis A. In addition, the actuator assembly 330 is mountable or couplable to the main tool body 310 to provide a reactionary pulling force against the extension shaft 220, via the fastener 320, in a second direction along the shaft axis A opposite the first direction, thereby overcoming the frictional force at the frustoconical linkage 230 and separating the extension shaft 220 from the main shaft 210.

In the shown case, the actuator assembly 330 includes a reaction pad 333 for transferring the pushing force from the inner cylinder 332 to the main shaft 210. The reaction pad 333 may have internal threading for fastening to an externally threaded portion of the main shaft first end 211, thereby securing the reaction pad 333 to the main shaft first end 211 and preventing accidental dislodgement. Other fastening means may be contemplated. As shown in FIG. 4B, the reaction pad 333 may have a diameter corresponding to a diameter of the main tool body radially inner surface 312.

According to some embodiments, the actuator assembly 330 further includes a cylindrical adapter 334 for operatively coupling the outer cylinder 331 to the main tool body 310. The depicted cylindrical adapter 334 includes a central bore with two sets of internal threading: a first set for engaging with external threading on the outer cylinder 331, and a second set for engaging with external threading on the main tool body 310. The first and second sets of threading thus correspond to thread patterns on the outer cylinder 331 and main tool body 310, respectively. In some cases, the first and second sets of threading may be different from one another and the cylindrical adapter 334 may be said to be unidirectional. In other cases, the first and second sets of threading may be identical, and the cylindrical adapter 334 may be reversible. The internal diameter of the cylindrical adapter 334 may vary, for instance if the outer cylinder 331 and main tool body 310 have different external diameters. Actuation of the inner cylinder 332 may cause the outer cylinder 331 to displace along the shaft axis A, as will be discussed in further detail below, thereby allowing the main tool body 310 and attached extension shaft 220 to displace as well along the shaft axis A. Other devices for coupling the outer cylinder 331 to the main tool body 310 may be contemplated.

As discussed above, in the shown case, a protective sleeve 340 may be provided for protecting the various components and helping the various components react to the applied forces by helping maintain the applied forces in a linear (i.e., along shaft axis A) direction. The protective sleeve 340, for instance a plastic head bushing, may be radially disposed between the extension shaft 220 and the main tool body 310 and prevent the applied forces from inadvertently applying undesirable bending moments against the crankshaft assembly 200. In addition, a fastener protective element 350 may be used for protecting against inadvertent dislodgement of a portion of the fastener 320. In the shown case, the fastener protective element 350 is a separate component that is mounted to the main tool body radially outer surface 313 (illustratively via fasteners 351). In other cases, the fastener protective element 350 may be integrally formed with the main tool body 310. The fastener protective element 350 may be disposed adjacent to and aligned with the installed fastener 320 to block or catch a dislodged portion of the fastener 320 (e.g., an errant head of a threaded fastener). Various sizes and shapes for the fastener protective element 350 may be contemplated.

Referring to FIGS. 4A-4E, the present disclosure teaches an exemplary method of disassembling a crankshaft assembly 200 including a first shaft (e.g., main shaft 210) operatively coupled to a second shaft (e.g., extension shaft 220) via a frustoconical linkage 230 and extending along a shaft axis A. A shaft removal tool (e.g., tool assembly 300) is installed to the crankshaft assembly 200, including installing a fastener 320 to operatively couple the shaft removal tool 300 to the second shaft 220. A pushing force is applied against the first shaft 210 in a first direction along the shaft axis A, the pushing force causing the shaft removal tool 300 to apply, in response to the pushing force, a pulling force against the second shaft 220 in a second direction along the shaft axis A opposite the first direction via the fastener 320 to overcome a frictional force at the frustoconical linkage 230 to separate the first shaft 210 from the second shaft 220.

Figure 4A:
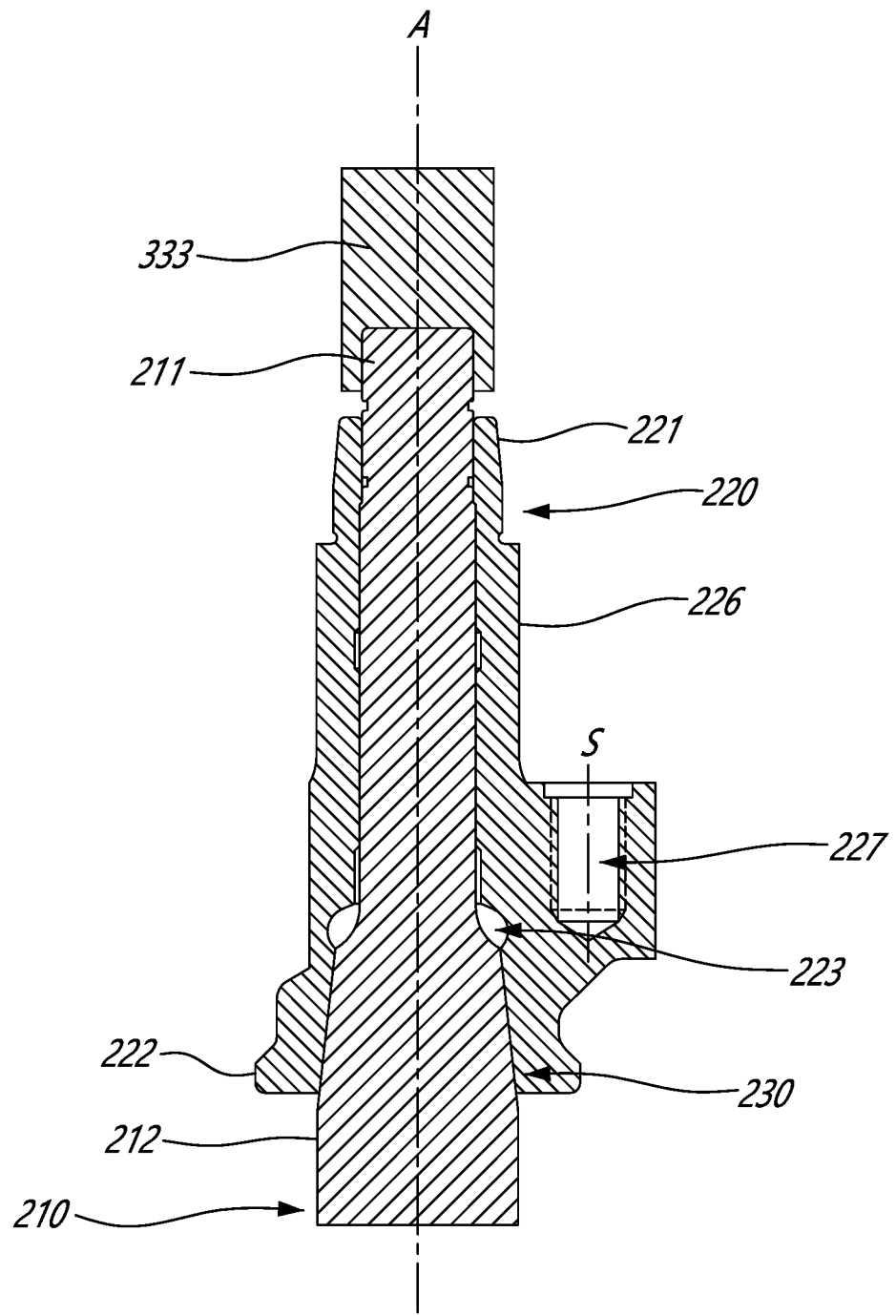
Figure 4B:
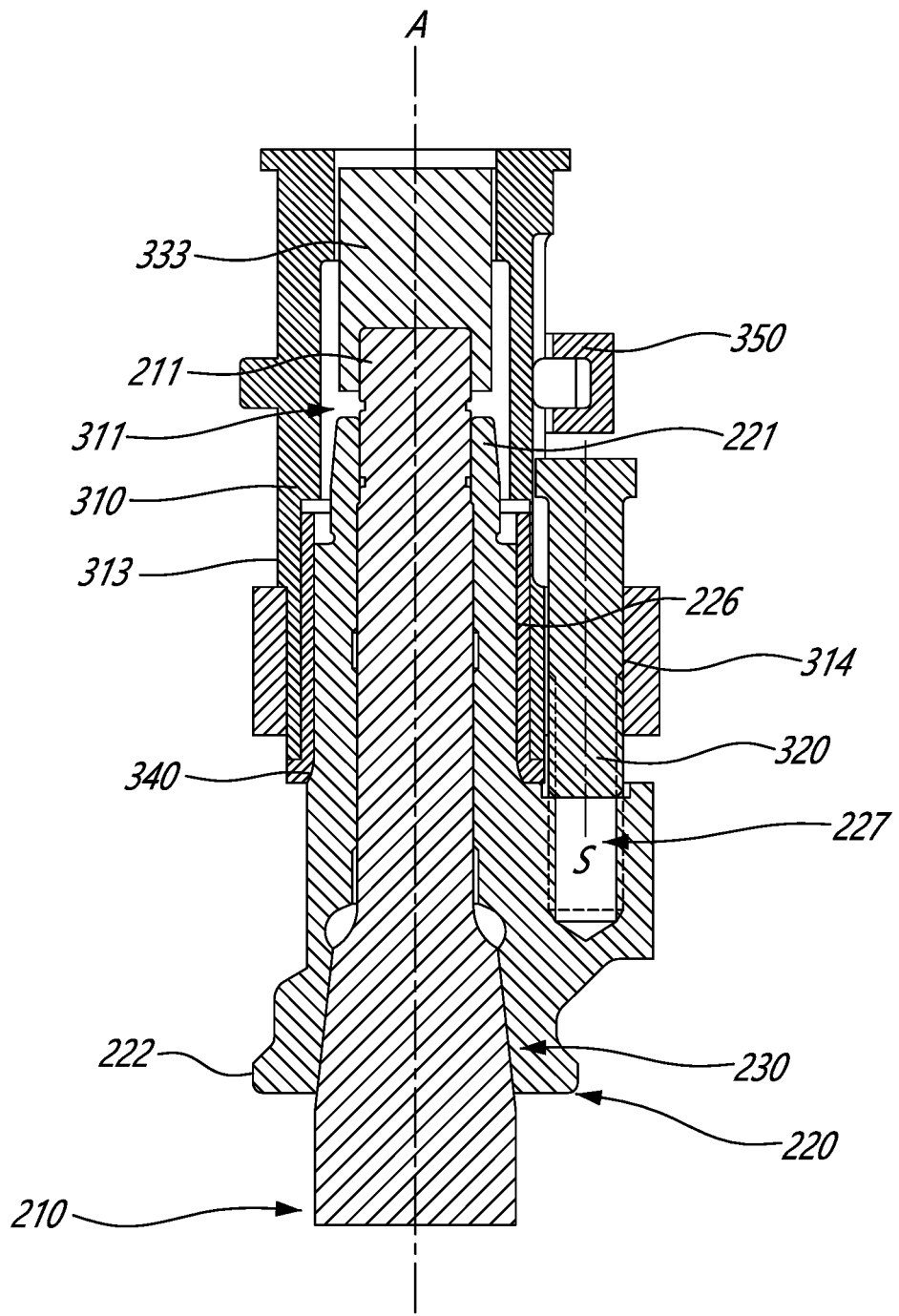

Referring to FIG. 4A, the crankshaft assembly 200 is shown in its assembled configuration (i.e., the main shaft 210 is inserted in the extension shaft central bore 223 with the frustoconical linkage 230 maintaining the connection between the main shaft 210 and the extension shaft 220 via the frictional force. To begin the disassembly process, the reaction pad 333 may be secured to the main shaft first end 211.

Referring to FIGS. 4B-4C, the tool assembly 300 is operatively coupled or mounted to the crankshaft assembly 200. In particular, the extension shaft 220 and reaction pad 333 are received within the main tool body central bore 311, with the protective sleeve 340 radially disposed between the extension shaft 220 and the main tool body 310. The main tool body fastener bore 314 is axially aligned with the extension shaft fastener slot 227 along the slot axis S, and the fastener 320 is inserted through the main tool body fastener bore 314 and the extension shaft fastener slot 227 to operatively couple the main tool body 310 to the extension shaft 220. The fastener protective element 350 may then be mounted to the main tool body 310 and axially aligned with the inserted fastener 320 (i.e., along slot axis S) to block or deflect a broken projectile portion of the fastener 320, for instance in a case of failure.

Figure 4D:
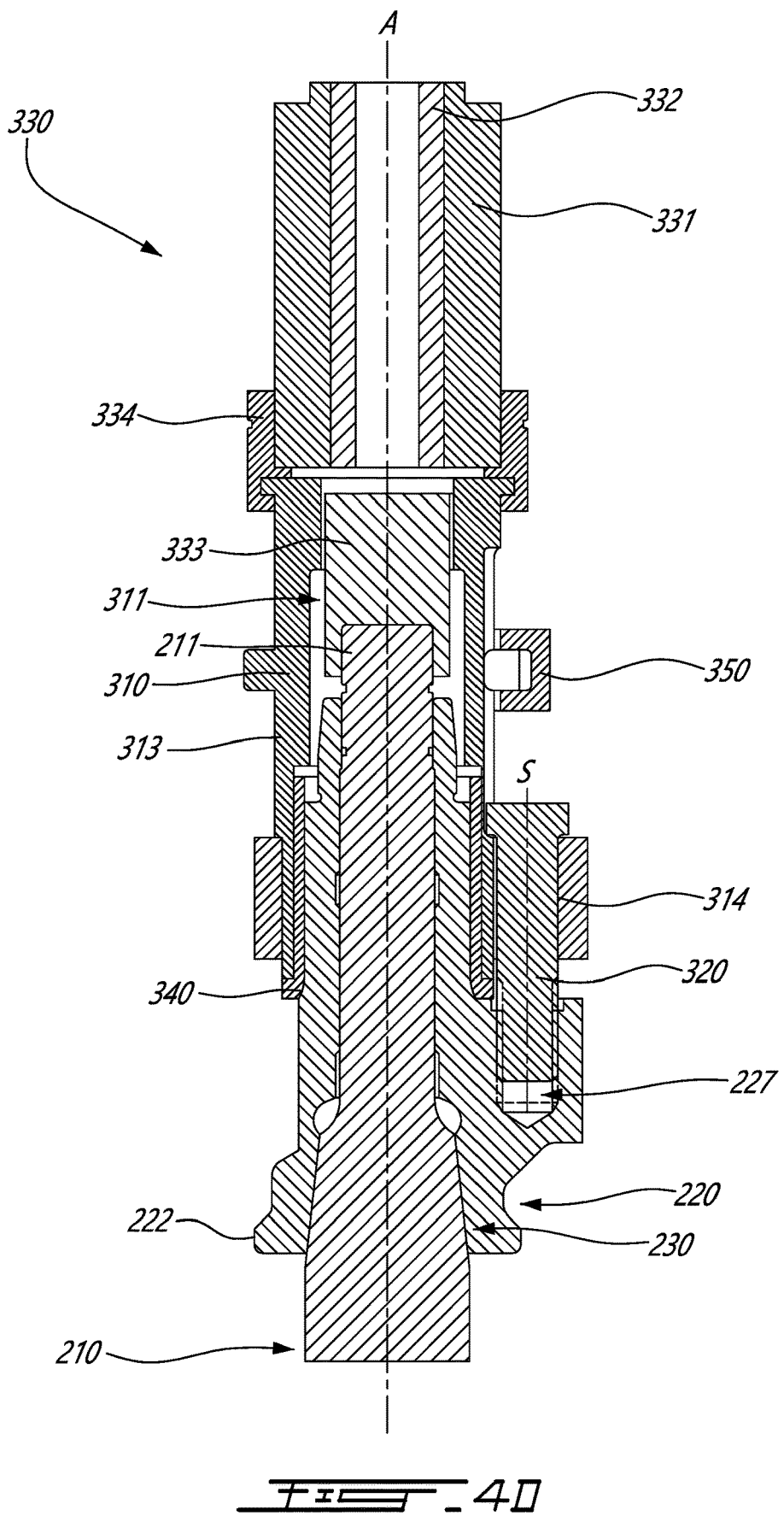

Referring to FIG. 4D, the actuator assembly 330 is mounted to the tool assembly 300, with both the outer cylinder 331 of the hydraulic actuator and the main tool body 310 fastened to the cylindrical adapter 334. In FIG. 4D, the inner cylinder 332 is shown in its retracted (or non-actuated) position.

Figure 4E:
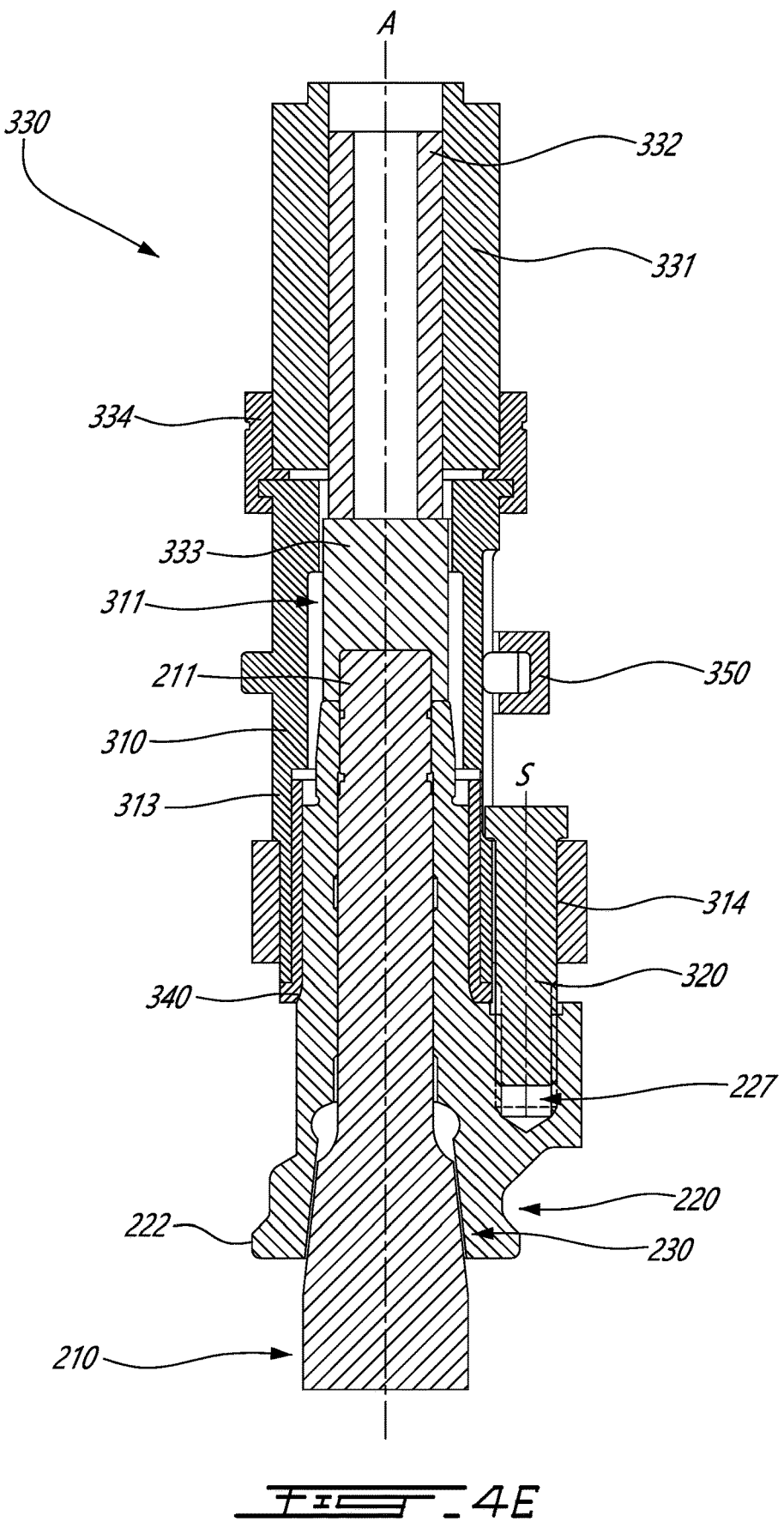

Referring to FIG. 4E, the hydraulic actuator is activated, for instance via an external control signal, and the inner cylinder displaces along the shaft axis A in the first direction to apply a pushing force against the reaction pad 333, which concurrently transfers the pushing force to the main shaft 210 at the main shaft first end 211. As the main shaft 210 is operatively coupled to the various rotary engines and is thus axially fixed in place, the pushing force is transferred to an equal-but-opposite pulling force by the main tool body 310 against the extension shaft 220, via the fastener 320, along the shaft axis A in a direction opposite the pushing force. This pulling force is sufficient to overcome the friction force at the frustoconical linkage 230 to separate the extension shaft 220 from the main shaft 210, thereby disassembling the crankshaft assembly 200.

In some embodiments, the tool assembly 200 is operable to overcome frictional forces at the frustoconical linkage 230 of up to 20,000 pounds, and withstand the transfer of these forces. Other force requirements may be contemplated.

According to some embodiments, there is provided a tool assembly for disassembling a crankshaft assembly including an axially fixed in place main shaft receivable within a hollow extension shaft along a shaft axis and operatively coupled to the extension shaft via a frustoconical linkage. The tool assembly comprises a main tool body having a main tool body central bore, a main tool body radially inner surface circumscribing the main tool body central bore, and a main tool body radially outer surface having a main tool body fastener bore, the extension shaft receivable within the main tool body central bore with the main tool body fastener bore axially alignable with an extension shaft fastener slot eccentrically disposed on an extension shaft radially outer surface. The tool assembly further comprises a fastener concurrently fastenable to the main tool body via the main tool body fastener bore and the extension shaft via the extension shaft fastener slot, and an actuator assembly operatively couplable to the main tool body and operable for applying a pushing force against an end of the main shaft in a first direction along the shaft axis. The main tool body, in response to the pushing force against the end of the main shaft, applies a pulling force against the extension shaft in a second direction along the shaft axis opposite the first direction, via the fastener, to overcome a frictional force at the frustoconical linkage and separate the extension shaft from the main shaft along the shaft axis.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A tool assembly for disassembling a crankshaft assembly, the crankshaft assembly including a main shaft received within a hollow extension shaft along a shaft axis and operatively coupled to the extension shaft via an interference fit, the hollow extension shaft having an extension shaft fastener slot, the tool assembly comprising:
   a main tool body having a main tool body central bore, a main tool body inner surface circumscribing the main tool body central bore, and a main tool body outer surface having a main tool body fastener bore, the main tool body central bore dimensioned for axially receiving the hollow extension shaft within the main tool body central bore, with the main tool body fastener bore axially aligned with the extension shaft fastener slot;
   a fastener dimensioned to be concurrently fastened to the main tool body via the main tool body fastener bore and the hollow extension shaft via the extension shaft fastener slot; and
   an actuator assembly with a linearly-displacing actuating element operatively coupled to the main tool body and operable for applying a force, via the linearly-displacing actuating element, against an end of the main shaft in a first direction from the actuator assembly towards the end of the main shaft along the shaft axis.

2. The tool assembly as defined in claim 1, wherein the actuator assembly includes a fluid driven cylinder operable to apply the force against the main shaft via a reaction pad.

3. The tool assembly as defined in claim 2, wherein the reaction pad is insertable through the main tool body central bore and fastenable to the end of the main shaft.

4. The tool assembly as defined in claim 3, wherein the reaction pad is internally threaded and threadably fastenable to the end of the main shaft.

5. The tool assembly as defined in claim 2, wherein the actuator assembly includes a cylindrical adapter operatively coupling a body of the actuator assembly to the main tool body.

6. The tool assembly as defined in claim 1, further comprising a protective sleeve radially disposable between the hollow extension shaft and the main tool body.

7. The tool assembly as defined in claim 1, wherein the main tool body fastener bore is axially aligned with an axis parallel to the shaft axis, and wherein the main tool body, in response to the force against the end of the main shaft, applies a pulling force against the hollow extension shaft in a second direction along the shaft axis opposite the first direction, via the fastener, to overcome a frictional force at the interference fit and separate the hollow extension shaft from the main shaft.

8. The tool assembly as defined in claim 1, further comprising a fastener protective element mountable to the main tool body radially outer surface at a position adjacent to and axially aligned with the main tool body fastener bore.

9. A method of disassembling a shaft assembly including a first shaft operatively coupled to a second shaft via an interference-fit linkage and extending along a shaft axis, comprising:
   installing the tool assembly of claim 1 to the shaft assembly, including installing the fastener to operatively couple the tool assembly to the second shaft; and
   using the tool assembly, separating the first shaft from the second shaft by applying a pushing force against the first shaft in a first direction along the shaft axis, the pushing force causing the tool assembly to apply a pulling force, in response to the pushing force, against the second shaft in a second direction along the shaft axis opposite the first direction via the fastener to overcome a frictional force at the interference-fit linkage.

10. The method as defined in claim 9, wherein the applying the pushing force against the first shaft includes applying the pushing force via a fluid driven actuator connected to the tool assembly.

11. The method as defined in claim 10, further comprising fastening a reaction pad to an end of the first shaft between the fluid driven actuator and the first shaft, such that the applying the pushing force against the first shaft includes passing the pushing force through the reaction pad.

12. The method as defined in claim 9, wherein the installing the tool assembly to the shaft assembly further comprises, prior to the installing the fastener to operatively couple the tool assembly to the second shaft, installing a protective sleeve radially between the tool assembly and the second shaft.

13. A system for disassembling a crankshaft assembly, comprising:
   a main shaft having a main shaft radially outer surface extending from a main shaft first end to a main shaft second end along a shaft axis, the main shaft radially outer surface including a main shaft frustoconical portion along a length of the main shaft, the main shaft being rotatable about the shaft axis and axially fixed in place;

an extension shaft having an extension shaft central bore, an extension shaft radially inner surface circumscribing the extension shaft central bore, and an extension shaft radially outer surface extending between an extension shaft first end and an extension shaft second end along the shaft axis, the extension shaft radially inner surface including an extension shaft frustoconical portion, the main shaft receivable within the extension shaft central bore with the main shaft frustoconical portion engaging the extension shaft frustoconical portion at a frustoconical linkage, the extension shaft further including an extension shaft fastener slot eccentrically disposed on the extension shaft radially outer surface;

a main tool body having a main tool body central bore, a main tool body radially inner surface circumscribing the main tool body central bore, and a main tool body radially outer surface having a main tool body fastener bore, the extension shaft receivable within the main tool body central bore with the main tool body fastener bore axially aligned with the extension shaft fastener slot;

a fastener dimensioned to be concurrently fastened to the main tool body via the main tool body fastener bore and the extension shaft via the extension shaft fastener slot; and an actuator assembly with a linearly-displacing actuating element operatively coupled to the main shaft first end, the actuator operable to apply a force, via the linearly-displacing actuating element, against the main shaft in a first direction from the actuator assembly towards the main shaft first end along the shaft axis.

14. The system as defined in claim 13, wherein the actuator assembly includes a fluid driven cylinder operable to apply the force against the main shaft via a reaction pad.

15. The system as defined in claim 14, wherein the reaction pad is insertable through the main tool body central bore and fastenable to the end of the main shaft.

16. The system as defined in claim 15, wherein the reaction pad is internally threaded and threadably fastenable to the end of the main shaft.

17. The system as defined in claim 14, wherein the actuator assembly includes a cylindrical adapter operatively coupling a body of the actuator assembly to the main tool body.

18. The system as defined in claim 13, further comprising a protective sleeve radially disposable between the extension shaft and the main tool body.

19. The system as defined in claim 13, wherein the main tool body fastener bore and the extension shaft fastener slot are axially aligned with an axis parallel to the shaft axis.

20. The system as defined in claim 13, further comprising a fastener protective element mountable to the main tool body radially outer surface at a position adjacent to and axially aligned with the main tool body fastener bore.

* * * * *